United States Patent
Hay

(10) Patent No.: US 7,475,116 B2
(45) Date of Patent: Jan. 6, 2009

(54) EMAIL OPEN RATE ENHANCEMENT SYSTEMS AND METHODS UTILIZING RECIPIENT OPENING HISTORY TO INCREASE THE LIKELIHOOD THAT AN EMAIL WILL BE OPENED

(75) Inventor: Donald William Hay, 3912 Kimbell Dr., Keller, TX (US) 76248

(73) Assignee: Donald William Hay, Keller, TX (US)

( * ) Notice: Subject to any disclaimer, the term of this patent is extended or adjusted under 35 U.S.C. 154(b) by 234 days.

(21) Appl. No.: 11/281,710

(22) Filed: Nov. 17, 2005

(65) Prior Publication Data

US 2007/0112920 A1     May 17, 2007

(51) Int. Cl.
  *G06F 13/00* (2006.01)
(52) U.S. Cl. ..................................... 709/206

(58) Field of Classification Search ................ 709/206
  See application file for complete search history.

(56) References Cited

U.S. PATENT DOCUMENTS

2004/0122900 A1*  6/2004  Pous et al. ................. 709/206

* cited by examiner

*Primary Examiner*—Robert B Harrell
(74) *Attorney, Agent, or Firm*—Thompson & Knight LLP; James J. Murphy

(57) ABSTRACT

A method of increasing the likelihood an electronic message will be opened by a targeted recipient includes determining a time zone corresponding to an address of a targeted recipient and accessing an opening history for a set of electronic mail recipients within a domain including the targeted recipient. From the time zone and the opening history at least one of a time and a day are recommended for sending an electronic message to the target recipient to increase likelihood that the electronic message will be opened.

18 Claims, 3 Drawing Sheets

Adding An Email Address to the System

Updating Ideal Send Times

Send Time is Requested by External Program

EMAIL OPEN RATE ENHANCEMENT SYSTEMS AND METHODS UTILIZING RECIPIENT OPENING HISTORY TO INCREASE THE LIKELIHOOD THAT AN EMAIL WILL BE OPENED

FIELD OF INVENTION

The present invention relates in general to electronic commerce, and in particular, to email open rate enhancement systems and methods.

BACKGROUND OF INVENTION

Electronic mail ("email") is an electronic message typed by a computer system user or generated by a computer or automated process and then transmitted over a computer network to another user. Receipt of these messages has been complicated over the past few years by the overwhelming number of unsolicited messages, commonly referred to as SPAM, sent to computer users. A method is needed to help senders of legitimate and solicited email get their message through to the intended recipient and have the messages be more likely to be opened, read, and acted upon.

Email users currently employ a number of methods to help them deal with the presence of unsolicited email messages. Many use additional software programs known as SPAM filters to mark and segregate messages from unknown senders or messages that contain certain key words and have other characteristics that identify a message as SPAM. Some email recipients look at the subject line of each message received and the sender and manually delete those that are not of interest. No matter what method is used for dealing with unsolicited email, the recipient is likely to deal with all unsolicited email at the same time.

The recipient is much more likely to open an email if it arrives after all unsolicited emails and other emails were dispatched. Said another way, it is more likely that a recipient of an email will open it if it arrives into their email in-box after they have dealt with all SPAM that was sent since the last time they read their email.

SUMMARY OF INVENTION

Embodiments of this invention generally provide the methods, tools, and algorithms to select the time and day that an email is sent in order to increase the likelihood that it will be opened by the recipient.

In the preferred embodiment, a single database is maintained of all email addresses and all email open records. Email senders submit each email for processing which includes determining the proper time to send the message and imbedding the codes necessary to detect when the email is opened. Each email open event is recorded in the database and later used to improve the accuracy of the recommended time to send the next messages to the same email address or others from the same domain.

In another embodiment, an agent receives a number of emails from a sending organization and determines the recommended time to send the email based on the algorithms and methods derived from this invention. The agent returns to that organization a specific date and time to send the email along with a custom code that is to be embedded in the email message so that it will be possible to record when that particular email is opened. The agent will then detect and record all email open events to improve the accuracy of the recommended time to send the next messages to the same email address or others from the same domain.

In another embodiment, these methods, algorithms, and knowledge base are compiled into a self-contained library of software subroutines and business objects, which are provided to, and used by, the email sending organization or individual. The routines and knowledge base are updated by periodic updates from a central repository of information. Alternatively the knowledge base could be made available via a computer network such as the Internet so the library routines can extract information in real-time as needed and apply them to email that is being sent.

In another embodiment, an organization submits an email message and a list of email addresses or criteria for selecting email addresses and the holder of these business processes calculates the recommended send time, adds the tracking string to the email, and performs the email transmission on behalf of the organization.

The summaries and embodiments outlined illustrate only typical embodiments of this invention and are therefore not to be considered limiting of its scope, for the invention may admit to other equally effective embodiments.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
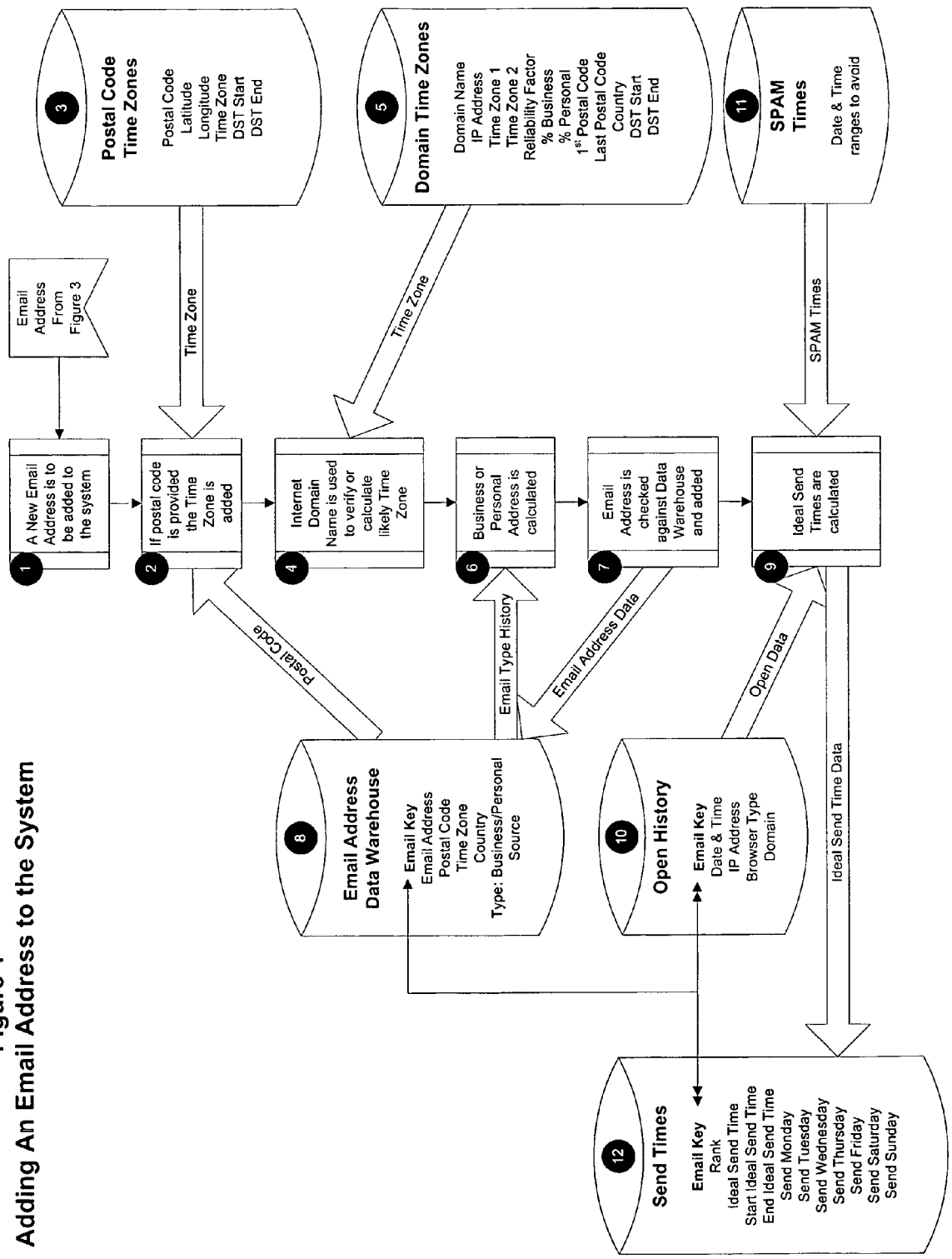
FIG. 1 is an illustration of a method to accept new email addresses into the system and calculate and store the recommended send time for that email address
Figure 2:
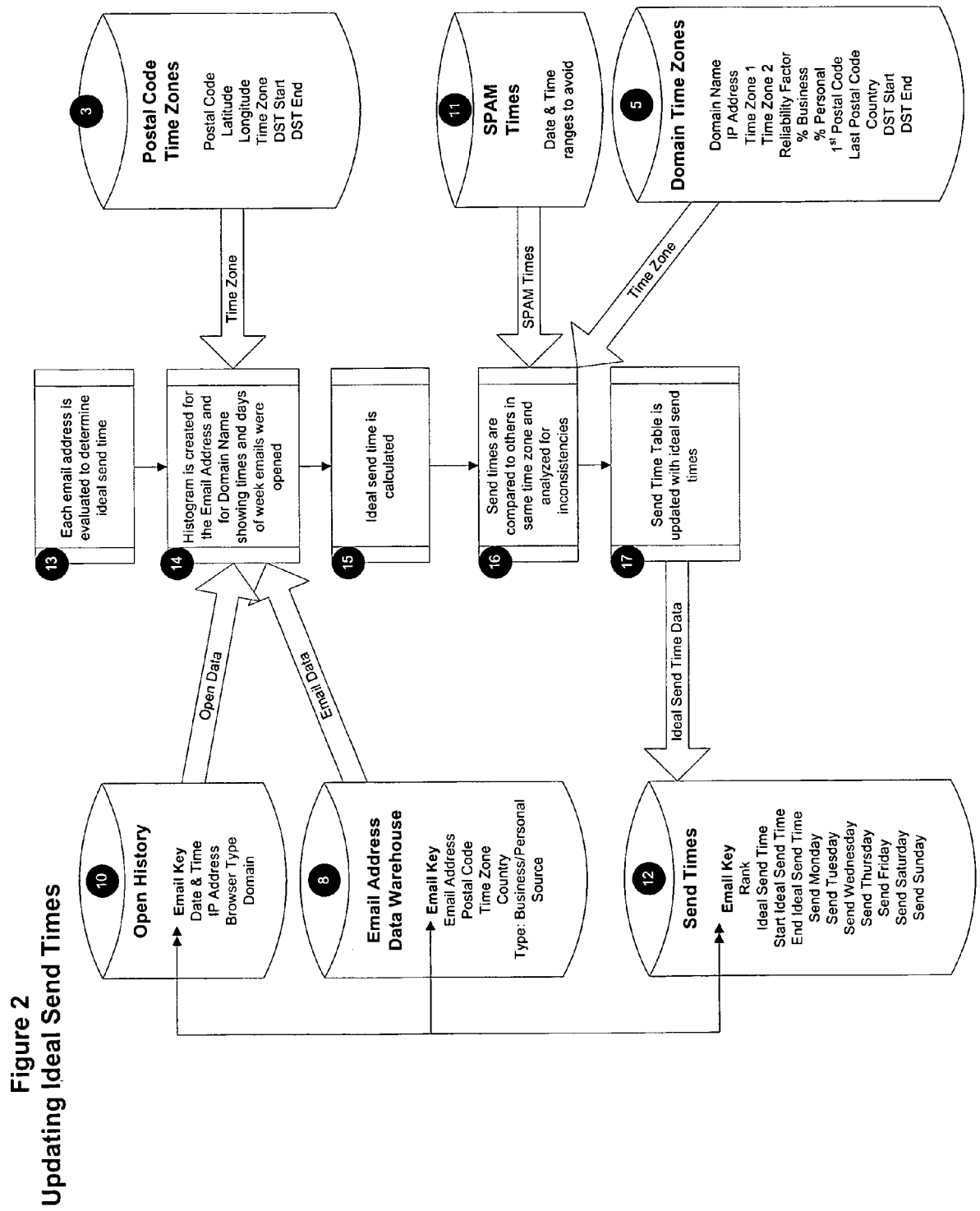
FIG. 2 is an illustration of an on-going process of updating the recommended send time for email addresses. It is necessary to regularly update the recommended send time since it is based in part on each email that is opened and emails are frequently opened and re-opened weeks and even months after they are sent.
Figure 3:
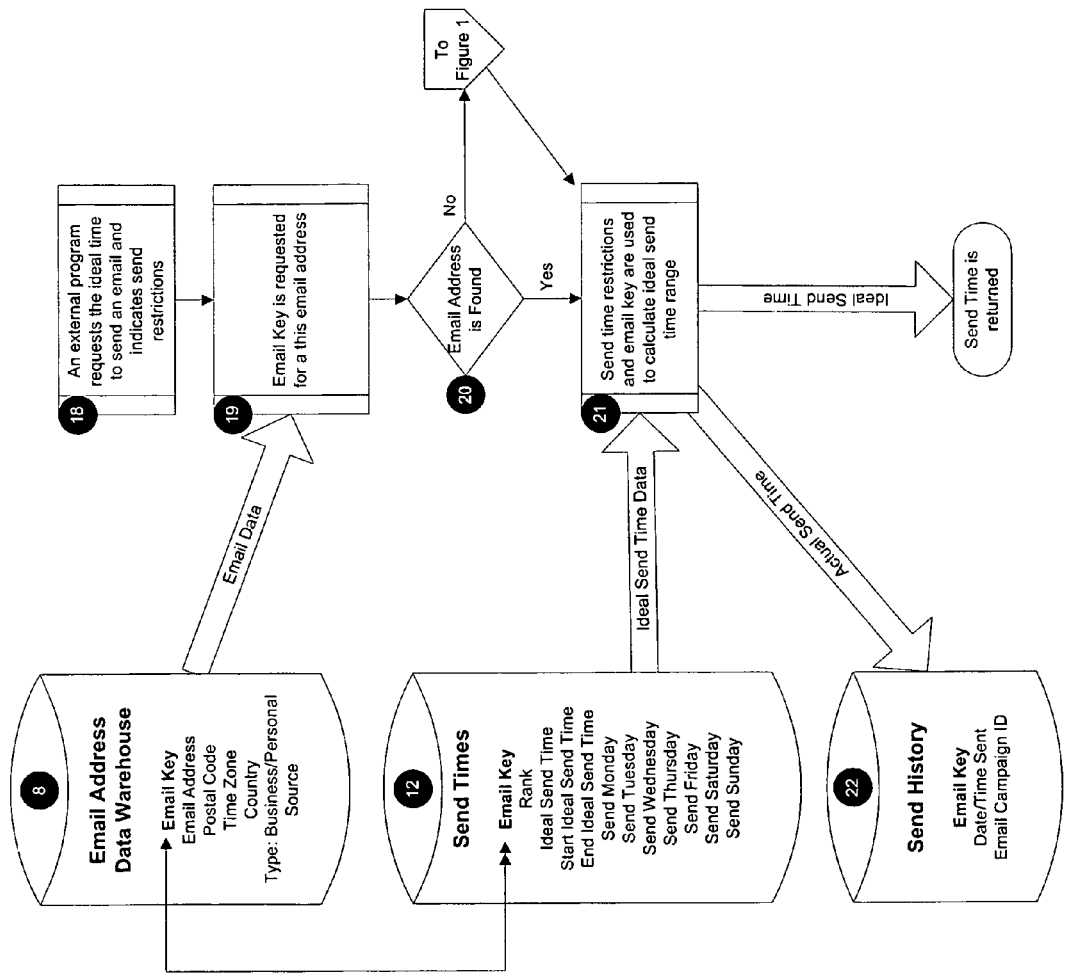
FIG. 3 is an illustration of a method applied when the recommended send time is to be recalled from the system for use in sending an email message.

The principles of the present invention and their advantages are best understood by referring to the illustrated embodiment depicted in FIGS. 1-3 of the drawings, in which like numbers designate like parts.

FIG. 1 shows the method applied to calculate and store the recommended send time for an email address that is submitted to the system. Process (1) accepts the email address and performs basic acceptance rules to ensure that the email address is valid. Process (2) determines if the postal code provided with the email address is valid and if so extracts the time zone and daylight savings time information from the Postal Code Time Zones data store (3). Process (4) strips the domain name from the email address and looks up the likely time zone for this domain from the Domain Time Zones data store (5) and compares the results with the output from Process (2). If the zip code was provided with the email address it is given priority and the Domain Time Zone data store (5) may be updated to reflect the additional time zone that it serves. For example, the domain wi.rr.com is used by Time Warner Road Runner to provide Internet access to people in southwestern Wisconsin. The overwhelming majority of people using an email address from that domain would be in the central time zone. People using the domain name of AOL.com, on the other hand, are from almost any time zone in the world and would certainly be in all time zones from Maine to Hawaii.

Process (6) takes email type history from the Email Address Data Warehouse (8) and classifies the email address as personal or business. This is done because personal addresses are more likely to be opened in the early evening and business addresses in the early- to mid-morning. The domain name is compared against the historical times at which emails to this domain have been opened. For example, a domain used by a small company would likely have all employees in the same time zone and would see a large number of their emails opened shortly after the time that employees begin arriving at work.

Process (7) adds or updates the email address in the Email Address Data Warehouse. Subsequent submissions of email addresses thus will update the postal code or time zone of a previous submission as more is learned about an individual email address or domain.

Finally, Process (9) calculates and stores the recommended time to send an email to the submitted email address. The Open History data store (10) provides historical information about when previous email was opened and reopened by the exact email address in the past (when available) and from email sent to the same domain. This is combined with data from the SPAM Times data store (11) to yield recommended time ranges for each day of the week and a ranking for that time range. The SPAM Times data store contains the times of day and days of the week when spammers typically generate large amounts of SPAM. For example, when it is prime business hours in Hong Kong, historically a source for large amounts of SPAM, it is late night in the United States. This invention would avoid sending email late at light to recipients in the United States unless the history of when they open their email specifically shows that they more frequently open email during those hours.

For example, the SPAM Times data store may indicate that an email should never be sent from Friday at noon through Monday at 8 am local time and should limit those sent on Monday and Friday. Open History might show that people from a particular domain open email 80% of the time between 8:31 a.m. and 11:15 a.m. on Monday through Friday and 92% of the time on Tuesday. Wednesday and Thursday between 9:00a.m. and 11:12a.m. Process 9 would likely return a record indicating an recommended (100 point) send time of 9 am Tuesday, Wednesday and Thursday, a second record indicating a very good send time (80 point) of 8:31 a.m. to 11:15 a.m. on Tuesday, Wednesday and Thursday, a third record indicating a good send time (70 points) of 8:31 a.m. to 11:15 a.m. Monday and Friday and two records indicating do-not-send (0 points) with one for 11:16 am. to 8:30 a.m. Monday through Friday and the other for all day Saturday and Sunday. This flexibility allows the system to send a message nearly immediately when necessary, but delay the send for a few days if the send time is not critical and they want to maximize the number of emails that are opened.

The output from Process (9) is stored in the Send Times data store (12) for use in processes identified in FIG. 2 and FIG. 3.

FIG. 2 shows the method applied to update the recommended send times for all email addresses already in the data warehouse. It is necessary to regularly update this Intonation since email is being opened at all times and that the recommended send time is based on these historical data.

Process (13) of FIG. 2 is used once for each email address in the Email Address Data Warehouse (8) each time the data warehouse is updated. Process (14) creates a histogram of the open times for the email address and a second histogram for the domain and IP address of that email address. The histograms show counts of the time of day and day of week for each open detected. Greater weight is applied to emails opened recently.

Process (15) analyzes the histograms to determine patterns for the given email address and domain and create ranked recommended send times. Process (16) analyzes the recommended send times for inconsistencies and modifies and eliminates records based on the known times to avoid because of bulk SPAM senders as provided by SPAM Times data store (11). Process (16) also looks at the IP address where the recipient opened the email and compares it to known time zones and postal codes for various IP addresses to try to further increase the accuracy of the time zone and postal code for this recipient. Process (17) updates the Send Times data store (12) with rank (score out of possible 100), and a date/time range for that rank.

FIG. 3 shows an embodiment of the extraction of an recommended send time for an email from the system for a given email address with some time restrictions. That is, an email is to be sent, but must be sent within a known time period causing the method to return the recommended time within those constraints.

Process (18) receives as input an email address, start date and time and end date time for the email send that is being proposed. For example, it may be critical that an email be sent within the next 24 hours to get a time-critical message to the recipient even if the most recommended (highest ranked) send time is not in that time period. Process (19) requests the email key associated with this email address and its time zone from the Email Address Data Warehouse (8). If the email address is not in the system, Decision Box (20) sends processing to FIG. 1 which adds the email address to the data store and calculates time zone and other data.

When the email address is available it is passed to Process (21) and all appropriate send times for this email address are analyzed. Process (21) then determines the recommended time to send the email and returns that value with a ranking. The send time for the email is then entered into the Send History data store (22).

The external sending program which is not covered by this invention will then execute the transmission of the message at the specified time. In the preferred embodiment of this method the message is transmitted with a tracking code embedded so that the exact time the email is opened is recorded back into Open History data store (10).

In the illustrated embodiment, one method of determining the recommended time and day to send an email is based on a point system that weights the information known about the targeted individual email address, their domain, and time zone. For discussion purposes, the following definitions are used.

The variable Mean_Time is calculated as the time which has an equal number of time events above and below it after removing the top 10% and the lower 10% of the data points. The variable First_Time is defined as the first event after removing the lower 10% of the data points. The variables Mean_Time and First_Time are calculated from the particular histogram discussed below.

The Day_Time Histogram shows each email open event plotted in fifteen-minute increments on a seven-day scale leading to 4*24*7=672 data points. The Day_Time_Domain Histogram shows each email open event for the domain of the email address plotted in fifteen-minute increments on a seven-day scale leading to 4*24*7=672 data points. The Mid-WorkWeek_Time Histogram shows each email open event plotted in fifteen-minute increments on a workweek scale. Emails opened on a Tuesday through Thursday are grouped together. Monday, Friday, Saturday and Sunday are plotted individually leading to 4*24*5=480 data points. The Work-Week_Time Histogram shows each email open event plotted in fifteen-minute increments on a workweek scale. Emails opened on a Monday through Friday are grouped together. Saturday and Sunday are plotted individually leading to 4*24*3=288 data points. The Time_Only Histogram plots each email open event by time of day in fifteen-minute increments ignoring the day of the week and thus grouping all days together leading to 4*24=96 data points.

Given the above definitions, a recommended time and a recommended day may be determined, according to the principles of the present invention, as follows.

Generally, Email open events detected within 60 minutes of one another are ignored and the first event of each 60 minute group is used. Email open events within 90 days of the date of calculation are weighted at 100% when added to a histogram. Email open events detected from 91 to 180 days of the date of calculation are weighted at 85% when added to a histogram. Other email open events are weighted at 50% when added to a histogram. Internet Domains are categorized as either Business, Personal or Unknown. They are evaluated by weekly analysis of all open email events for each domain. Domains where 62% of emails are opened on a weekday during business hours of 8 .a.m. to 5 p.m., adjusted for time zone, are categorized as Business. Domains where 62% of emails are opened on a weekend or on a weekday during evening hours of 6 p.m. to midnight, adjusted for time zone, are categorized as personal. The histograms are analyzed to detect peaks. These equations are applied in order as shown below and the first one that passes is used.

When at least three open events have been recorded for this particular target email address, then the target time and day creation proceeds as follows.

If the Day_Time Histogram shows a peak containing 80% to 100% of open events within three hours of each other, the time and day are calculated as:
(1) Time=Mean_Time−(0.33×(Mean_Time−First_Time)); and
(2) Day=Day on which the peak occurs.
If the MidWorkWeek_Time Histogram shows a peak containing 80% to 100% of open events within three hours of each other, the time and day are calculated as:
(3) Time=Mean_Time−(0.33×(Mean_Time−First_Time)); and
(4) Day=If the peak was on a particular day use the day on which the largest number of emails were opened ELSE use the day as shown in the Day_Time histogram where the largest number of email open events were detected.
If the WorkWeek_Time Histogram shows a peak containing 80% to 100% of open events within three hours of each other, the time and day are calculated as:
(5) Time=Mean_Time−(0.33×(Mean_Time−First_Time)); and
(6) Day=If the peak was on a particular day use the day on which the largest number of emails were opened ELSE use the day as shown in the Day_Time histogram where the largest number of email open events were detected.

The procedure defined by Equations (1)-(6) is repeated using a window of eight hours instead of three, and repeated again looking for peaks containing 65% or more of the data points.

However, when one to three open events have been detected for the target email address, then the target time and day creation proceeds as follows.

If all open events are on the same day of the week:
(7) Time=Mean_Time; and
(8) Day=The day of the week all were detected.
If all open events are on a weekend:
(9) Time=Mean_Time; and
(10) Day=Saturday.
If all open events are on any weekday and one open event was on a Tuesday:
(11) Time=Mean_Time; and
(12) Day=Tuesday.
If all open events are on any weekday:
(13) Time=Mean_Time; and
(14) Day=First day of the week where an open was detected.
Otherwise:
(15) Time=Mean_Time; and
(16) Day=Any day they opened an email.

Finally, when no open events have been detected for the target email address and more than ten email open events have been detected for this Internet domain, then the target time and day creation proceeds as follows.

If this is a business domain, the time and day are calculated as:
(17) Time=Mean_Time−(0.33×(Mean_Time−First_Time)); and
(18) Day=Day on which over 30% of email opens occur OR Tuesday if no day has 30% of email opens.
If this is a personal domain, the time and day are calculated as:
(19) Time=Mean_Time−(0.33×(Mean_Time−First_Time));
(20) Day=Saturday if more than 30% of email opens for this domain are opened on a weekend;
(21) Day=Tuesday if more than 70% of email opens for this domain are opened on a weekday; and
(22) Otherwise, Day=any day.
If this is an unknown domain, the time and day are calculated as:
(23) Time=Mean_Time;
(24) Day=Saturday if more than 30% of email opens for this domain are opened on a weekend;
(25) Day=Tuesday if more than 70% of email opens for this domain are opened on a weekday; and
(26) Otherwise, Day=any day.

After the appropriate one of the three procedures described above is performed, and the recommended day of week and time has been calculated, it is checked and modified to further improve its viability using the Common SPAM Time equations, which in the illustrated embodiment can be described as follows.

The Common SPAM Time equations take into account the fact that the majority of unsolicited commercial email occurs between the hours of 2 a.m. GMT and noon GMT. This is largely due to the fact that much of the unsolicited email is being generated during business hours in Far East regions, such as Hong Kong, and in the late evenings of Western nations, as entrepreneurs purchase lists and send email. These times happen to overlap making times to avoid sending email easy to calculate. These equations take the time that was calculated in the processing section shown below and advances the send time as necessary to avoid the known bad times. The Common SPAM equations are:
(27) Email scheduled to be sent on a weekday before 9 a.m., adjusted for time zone, are rescheduled for 9.a.m.;
(28) Email scheduled to be sent on a weekday after 4 .a.m. adjusted for time zone, are rescheduled for 3:30 .p.m. the same day; and

(29) Email scheduled for a weekend are verified as a personal address and if it is not strongly Indicated the email send time is moved to the following Tuesday at 9 .a.m. local time.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of increasing a likelihood an electronic message will be opened by a targeted recipient comprising:
    determining a time zone corresponding to an address of a targeted recipient;
    accessing an opening history for a set of electronic mail recipients within a domain including the targeted recipient; and
    determining from the time zone and the opening history at least one of a time and a day for sending an electronic message to the target recipient to increase a likelihood that the electronic message will be opened.

2. The method of claim 1, wherein accessing the opening history comprises accessing an opening history for a set of electronic mail recipients including the targeted recipient.

3. The method of claim 1, wherein the method further comprises determining a type of the address of the targeted recipient and wherein determining at least one of the time and the day further comprises accounting for the type of address of the targeted recipient.

4. The method of claim 3, wherein the type of address is selected from the group consisting of personal and business address types.

5. The method of claim 1, wherein determining at least one of the time and the day comprises determining a range of times ranked by the likelihood that the electronic message will be opened.

6. The method claim 1, wherein determining at least one of the time and the day comprises determining a range of days ranked by the likelihood that the electronic message will be opened.

7. The method of claim 1, wherein determining at least one of the time and the day further comprises accounting for undesirable time periods caused by trafficking of undesirable electronic messages.

8. The method of claim 1, further comprising updating the opening history.

9. The method of claim 1, wherein determining the time zone comprises determining the time zone by analyzing the domain name including the targeted recipient.

10. The method of claim 1, wherein determining the time zone comprises determining the time zone from a postal code provided with an email address for the targeted recipient.

11. A method for increasing a likelihood an email to a targeted recipient will be opened comprising:
    determining an opening history for the targeted recipient;
    determining a time zone associated with the targeted recipient through an analysis of a domain name associated with the targeted recipient;
    determining common times during which unsolicited email is sent; and
    determining from the time zone, an opening history of the targeted recipient, and the common times during which unsolicited email is sent, a time for sending an email to the targeted recipient with an increased likelihood of the email being opened.

12. The method of claim 11, further comprising determining a day for sending the email to the targeted recipient with the increased likelihood of the email being opened.

13. The method of claim 11, wherein the method further comprises generating a knowledge base including opening histories for a plurality of other email recipients associated with the domain name and wherein determining the time for sending the email to the target recipient further comprises analyzing the opening histories of the plurality of email recipients.

14. The method of claim 11, wherein the method further comprises generating a knowledge base including opening histories for a plurality of other email recipients associated with the domain name and wherein determining the time zone further comprises analyzing the opening histories for the plurality of other email recipients.

15. The method of claim 11, wherein determining the time for sending the email to the targeted recipient with the increased likelihood of the email being opened comprises generating a plurality of possible times for sending the email with the increased likelihood of the email being opened.

16. The method of claim 11, further comprising ranking the plurality of possible times by likelihood of the email being opened.

17. The method of claim 11, wherein determining the time for sending the email to the targeted recipient utilizes a point system based on the opening history of the targeted recipient, the time zone, and the domain associated with the domain name.

18. The method of claim 11, wherein determining the time for sending the email to the target recipient utilizes a set of histograms based on opening events within the domain associated with the domain name.

* * * * *